(12) United States Patent
Lerenc (10) Patent No.: US 8,868,529 B2
(45) Date of Patent: Oct. 21, 2014

(54) N-DIMENSIONAL LOCKING

(75) Inventor: Vedran Lerenc, Schoenau (DE)

(73) Assignee: SAP SE, Walldorf (DE)

( * ) Notice: Subject to any disclaimer, the term of this patent is extended or adjusted under 35 U.S.C. 154(b) by 173 days.

(21) Appl. No.: 13/328,173

(22) Filed: Dec. 16, 2011

(65) Prior Publication Data

US 2013/0159266 A1 Jun. 20, 2013

(51) Int. Cl.
*G06F 7/00* (2006.01)

(52) U.S. Cl.
USPC .......................................... 707/704

(58) Field of Classification Search
USPC .................. 707/704, 616, 808, 707, 999.008
See application file for complete search history.

(56) References Cited

U.S. PATENT DOCUMENTS

| | | | | |
|---|---|---|---|---|
| 3,761,892 A * | 9/1973 | Bosnyak et al. | ............... | 235/382 |
| 7,236,974 B2 * | 6/2007 | Bhattacharjee et al. | ............... | 1/1 |
| 7,769,680 B2 * | 8/2010 | Driscoll et al. | ................. | 705/37 |
| 8,126,903 B2 * | 2/2012 | Lehmann et al. | ............. | 707/758 |
| 2006/0178949 A1 * | 8/2006 | McGrath | ......................... | 705/26 |
| 2007/0276595 A1 * | 11/2007 | Lewinson et al. | ............. | 701/209 |
| 2008/0021723 A1 * | 1/2008 | Devarakonda | ..................... | 705/1 |
| 2008/0091342 A1 * | 4/2008 | Assael | .......................... | 701/202 |
| 2009/0216600 A1 * | 8/2009 | Hill | ................................... | 705/9 |
| 2009/0234658 A1 * | 9/2009 | Greenwell et al. | ................. | 705/1 |
| 2011/0125794 A1 * | 5/2011 | Hutschemaekers | ........... | 707/776 |
| 2011/0145089 A1 * | 6/2011 | Khunger et al. | ............. | 705/26.4 |
| 2011/0153629 A1 * | 6/2011 | Lehmann et al. | ............. | 707/758 |
| 2011/0238562 A1 * | 9/2011 | Driscoll et al. | ................. | 705/37 |
| 2012/0041675 A1 * | 2/2012 | Juliver et al. | ................. | 701/465 |

\* cited by examiner

*Primary Examiner* — Mohammed R Uddin
(74) *Attorney, Agent, or Firm* — Kenyon & Kenyon LLP (57) ABSTRACT

An apparatus, method and computer-readable storage medium for determining intent object preferences for locking intent objects, and grouping the intent objects into sets based on the intent object preferences for locking. The sets may contain intent objects with matching preference values for the intent object preferences for locking. Each set may be locked such that only a matcher object associated with the set may operate on the set. The locking may be done in memory, or via a database. The matcher associated with a set may determine whether the intent objects in that set match other intent objects in the set. Multiple matchers may operate on their associated sets in parallel.

17 Claims, 5 Drawing Sheets

N-DIMENSIONAL LOCKING

BACKGROUND

There are software applications which match individuals based on the preferences of the individuals. These applications may include carpooling applications, where individuals are grouped into a carpool based on various preferences. The preferences may include the route, time of transport, etc. Another example is an application to group individuals for a book club based on preferences such as book genre, and location of the book club. In order to perform operations for matching individuals based on preferences, an application may logically organize the information about individuals and their associated preferences into data structures, which may be called intent objects, and other data structures to match the intent objects based on preferences, and these data structures may be called matcher objects. Based on matching performed by the matcher objects, intent objects may be grouped into different groups.

When an application matches individuals, there are certain constraints which are imposed. For example, a carpooling application may not assign an individual to two different car pools at the same point in time. In other words, an application may not put the same intent into two different groups. In order to operate within such constraints, an application may process intent objects in a serial fashion, so that only one individual's preferences are analyzed at a time. However, serial processing may be problematic when the number of individuals and preferences to be processed are high, which may limit the scaling capabilities of the application. In addition, serial processing may not effectively utilize the features of computer hardware such as multiple processors and processors with multiple cores. Therefore, there is a need for processing intent objects in parallel to effectively analyze individuals' preferences.

DETAILED DESCRIPTION

Embodiments may be discussed in systems and processes to efficiently analyze intent objects in a parallel. In particular, embodiments of the present invention pertain to a feature for determining intent object preferences for locking intent objects, and grouping the intent objects into sets based on the intent object preferences for locking. The sets may contain intent objects with matching preference values for the intent object preferences for locking. Each set may be locked such that only a matcher object associated with the set may operate on the set. The locking may be done in memory, or via a database. The matcher associated with a set may determine whether the intent objects in that set match other intent objects in the set. Multiple matchers may operate on their associated sets in parallel. In an embodiment, the above discussed features may be implemented in a carpooling context, where the matchers are ride matchers, and the intents are ride intents. In an embodiment, the intent object preferences for locking may include smoking, music, sex, gender, origin of ride, destination of ride, time window of ride, driving style, conversation style, area of occupation, vehicle type, and temperature inside vehicle.

Figure 1:
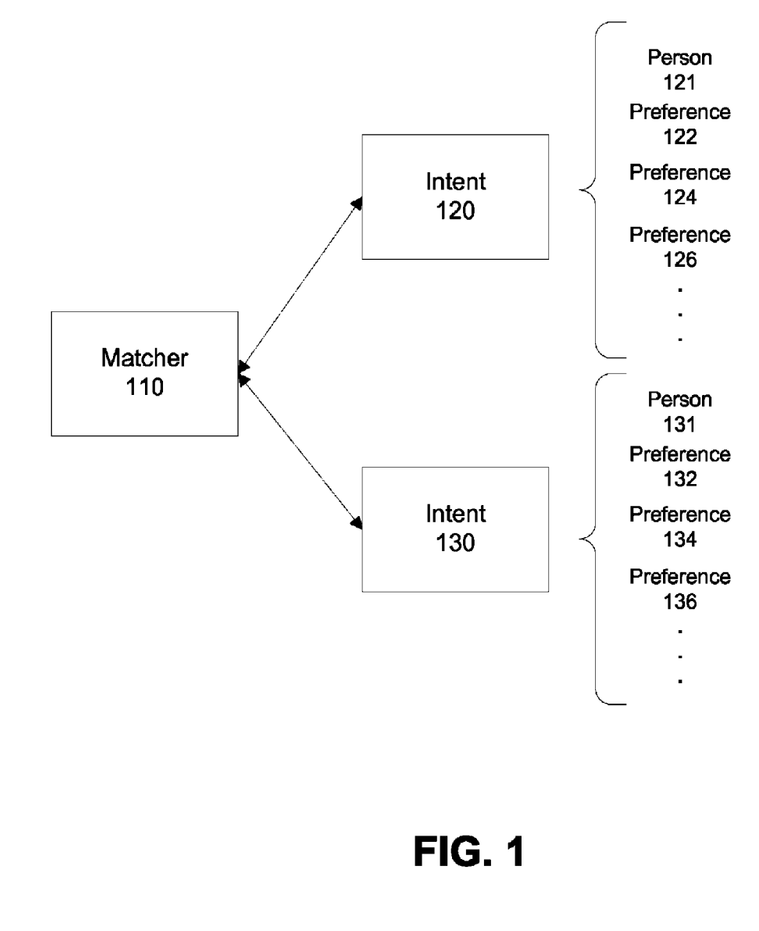
FIG. 1 shows an interaction between a matcher and intents in an exemplary embodiment.

FIG. 1 shows an interaction between a matcher 110 and intents, 120 and 130, in an exemplary embodiment. Intent 120 defines the preferences of a person 121. The preferences of person 121 may be any set of preferences including preference 122, 124, and 126. Intent 130 defines the preferences of another person 131. The preferences of person 131 may be any set of preferences including preference 132, 134, and 136. Intents 120 and 130 may define preferences and associate them with a person in any context. For example, in an embodiment, an intent may define the preferences of a person pertaining to social or sports events such as tennis practice. The preferences may include a) the time at which the associated person likes to practice tennis, b) the location at which the associated person likes to practice tennis, c) whether the person likes to play singles or doubles matches, d) the skill level of the opponent or opponents, and so on. In another exemplary embodiment, an intent may define the preferences of a person looking to join a book club. The preferences may include a) the time at which the associated person would like to discuss books with others, b) the location at which the associated person would like to have discussion pertaining to a book, c) the types of books the associated person is interested in, d) the number of books the associated person usually reads in a given period of time, and so on.

In another exemplary embodiment, an intent (or ride intent) may define the preferences of a person interested in car pooling. The preferences may include a) the time at which the person associated with the ride intent needs to arrive at the destination, b) the earliest time at which the associated person is willing to depart from the destination, c) whether the associated person prefers to smoke in the vehicle, d) the type of music the associated person likes to listen to, e) origin of the ride, f) destination of the ride, g) sex/gender of the other passengers in the car, h) driving style of the vehicle (ex: aggressive or conservative), i) conversation topics among passengers in the vehicle, j) occupation areas of the passengers in the vehicle, k) vehicle type or model, l) temperature range inside the vehicle, and so on. It will be evident to a person having ordinary skill in the art that an intent may define any event or activity where a person may have preferences. The above examples are illustrative, and are not intended to limit the scope of the invention.

A matcher 110 may determine if a match exists between intents 120 and 130 based on the preferences defined by the intents. A matcher may match any type of intents which define preferences for any activity or event. In an embodiment, the matcher 110 (or ride matcher) may match intents (or ride intents) 120 and 130, which define the preferences of a person interested in car pooling. In an embodiment, intent 120 may include preferences 122, 124, and 126 of person 121. Preference 122 may be a preference to travel between a time window of 9 AM and 10 AM. Intent 130 may include preferences 132, 134, and 136 of person 131. Preference 132 may be a preference to travel between a time window of 8 AM and 10 AM. Preference 122 matches preference 132 since both person 121 and 131 are willing to travel during the same time window. Similarly, preference 124 may match preference 134, and preference 126 may match preference 136. If all the preferences of intent 120 match all the preferences of intent 130, matcher 110 may determine that intent 120 matches intent 130.

The method utilized by matcher 110 to determine whether there is a match between two intents may vary based on the context. In an embodiment, if one preference from intent 120 does not match a corresponding preference from intent 130, the matcher 110 may determine that intent 120 and intent 130 do not match. In another embodiment, if a subset of preferences from intent 120 match a corresponding subset of preferences from intent 130, the matcher may determine that intent 120 matches intent 130. In an embodiment, matching preferences of intents may be assigned different weights, and if the sum of the weights of matching preferences between two intents exceeds a weight threshold, the matcher may determine that the intents match.

In an embodiment, the granularity of matching may be defined on a preference level. For example, in an embodiment, the matcher 110 may match intents (or ride intents) 120 and 130, which define the preferences of a person interested in car pooling. Preference 122 may be a preference to listen to trance music in the vehicle. Corresponding preference 132 may be a preference to listen to house music. The matcher 110 may determine that house music and trance music, although not equivalent, are similar enough, and therefore preference 122 and 132 match. However, matcher 110 may not match a trance music preference and a western music preference due to the considerable difference between the two. Preference 124 may be a preference to smoke in the vehicle. Corresponding preference 134 may be a preference to travel in a non-smoking vehicle. Since preferences 124 and 134 cannot exist together in one vehicle, the matcher may determine that preference 124 does not match preference 134. Thus, the matcher 110 may apply a strict standard when comparing a set of corresponding preferences (smoking preference), and apply a flexible standard when comparing another set of corresponding preferences (music preference).

In another embodiment illustrating flexible matching, preference 122 may be a preference to depart from origin A. Corresponding preference 132 may be a preference to depart from origin B. The matcher 110 may determine that origin A and origin B, although not the exact same location, are within a particular distance from each other, and therefore preference 122 and 132 match. I.e., origin A is within a geographic detour area from origin B. The geographic detour area may be predefined, and may be set to any value.

In another embodiment, matcher 110 may determine that although origin A and B are not the exact same location, origin B is en route to a destination from origin A. In other words, when travelling from origin A to the destination, origin B is on the way. Thus, matcher 110 may match origin A (preference 122) and origin B (preference 132).

In a further embodiment, matcher 110 may determine that origin A and B are not the exact same location, and that origin B is not en route to a destination from origin A. However, matcher 110 may determine that origin B is within a geographic detour area from a point in the route between origin A and a destination, i.e., when travelling from origin A to the destination, one only needs to make a slight detour to access origin B. Thus, matcher 110 may match origin A (preference 122) and origin B (preference 132). In another embodiment if origin B is not within the geographic detour area, matcher 110 may determine that origin A and origin B do not match.

The above examples are illustrative of varying the granularity of matching, and are not intended to limit the scope of the invention. In an embodiment, a flexible or strict comparison standard may be applied to any set of corresponding preferences.

Figure 2:
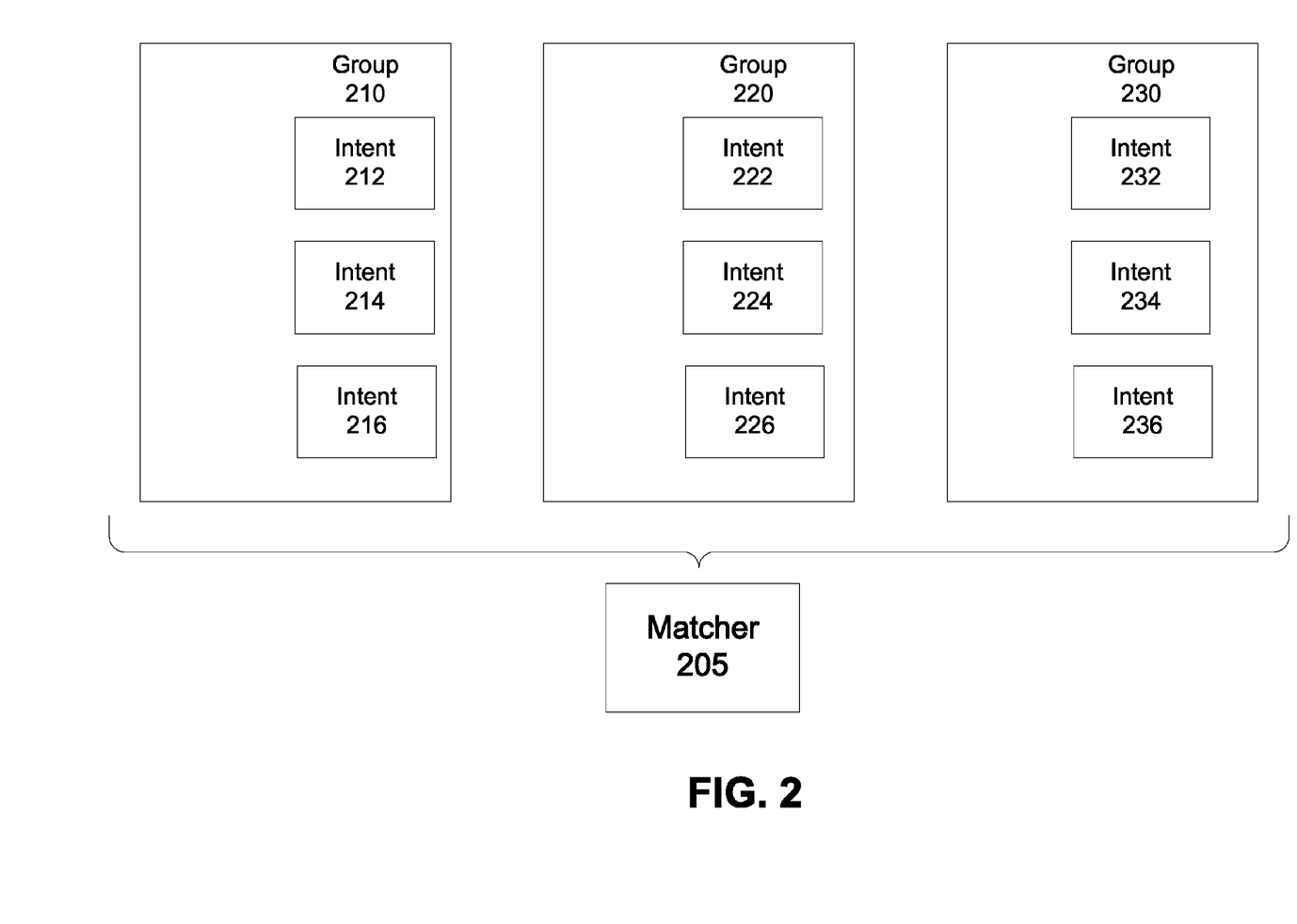
FIG. 2 illustrates an exemplary embodiment where multiple ride intents are grouped based on matching performed by a matcher.

FIG. 2 illustrates an exemplary embodiment where multiple ride intents are grouped based on matching performed by a matcher. In an embodiment, matcher 205 may determine that a) intents 212, 214, and 216 match, b) intents 222, 224, and 226 match, and c) intents 232, 234, and 236 match. Therefore, intents 212, 214, and 216 may be grouped into group 210, intents 222, 224, and 226 may be grouped into group 220, and intents 232, 234, and 236 may be grouped into group 230. Matcher 205 may match any type of intents which define preferences for any activity or event. In an exemplary embodiment, an intent (or ride intent) may define the preferences of a person interested in car pooling. Matcher 205 may be utilized for matching intents into groups for scheduling car pools between various individuals. In an embodiment, group 210 may include ride intents defining individuals with a matching set of preferences. For example, a person associated with ride intent 212, may prefer to travel on the same route as the persons associated with ride intents 214 and 216, have the same music preference as the persons associated with ride intents 214 and 216, and be a non-smoker, similar to the persons associated with ride intents 214 and 216. Similarly, groups 220 and 230 may include ride intents defining individuals with a matching set of preferences.

In an embodiment, a constraint may be enforced such that a single ride intent may not belong to two different groups. For example, ride intent 212 only belongs to group 210, and is not part of groups 220 or 230. Such a constraint may avoid scenarios where, for example, a person is scheduled to ride in two different vehicles at the same exact time. In order to enforce such a constraint, in an embodiment, only one matcher 205 may operate on multiple intents at any given time. This ensures that a single intent is not matched into more than one group.

Although a single matcher 205 operating on multiple intents at any given time may ensure that a single intent is not matched into more than one group, this approach may be inefficient as the number of intents increase, since matcher 205 will have to examine each intent at a time and compare it to other intents. For example, if a matcher, implemented via a computer system, needs 10 seconds to check an intent for a match, the matcher can at most process 8640 intents per day. Therefore, a single matcher may not scale well for large applications. In addition, a single matcher may not be able to maximize the advantages offered by modern multi-core hardware which employs more than one processor or core. To address these issues, in an embodiment, multiple matchers may process multiple intents simultaneously.

Figure 3:
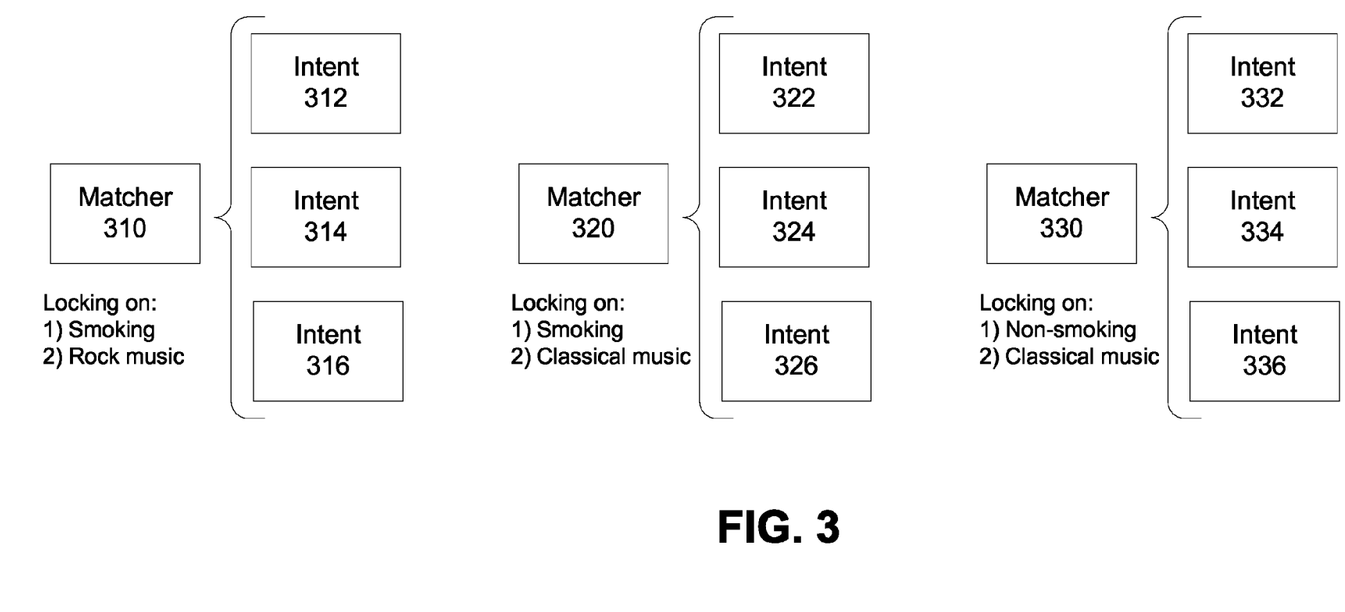
FIG. 3 illustrates an exemplary embodiment where multiple matchers operate on intents simultaneously.

FIG. 3 illustrates an exemplary embodiment where multiple matchers operate on intents simultaneously. Matchers 310, 320, and 330 may operate on separate sets of intents so that a single intent is not matched into two different groups of intents. In an embodiment, the matchers 310, 320, and 330 may match intents (or ride intents), which define the preferences of people interested in car pooling. Intents 312, 314, 316, 322, 324, 326, 332, 334, and 336 may include preferences pertaining to a) the time at which the person associated with the ride intent needs to arrive at the destination, b) the earliest time at which the associated person is willing to depart from the destination, c) whether the associated person prefers to smoke in the car, d) the type of music the associated person likes to listen to, e) origin of the ride, f) destination of the ride, g) sex/gender of the other passengers in the car, h) driving style of the vehicle (ex: aggressive or conservative), i) conversation topics among passengers in the vehicle, j) occupation areas of the passengers in the vehicle, k) vehicle type or model, and l) temperature range inside the vehicle. For intents to match, all preferences of the intents may have to match.

In order to ensure that more than one matcher does not operate on the same intent simultaneously, matchers 310, 320, and 330 may lock intents based on the preferences of the intents. When a matcher locks an intent, other matchers may not operate on the locked intent at the same time. In an embodiment, the matchers may lock intents based on any number of preferences, i.e., on n-dimensions. In an embodiment, the matchers may lock intents based on two preferences, i.e., on two dimensions. The matchers may lock intents based on the value of smoking/non-smoking preference, and musical preference. One of the advantages of locking in this manner is that only the preferences relevant for locking have to be read prior to matchers obtaining the lock. Matcher 310 may lock all intents (312, 314, and 316) which have a smoking preference, and a musical preference of rock music. On the other hand, matcher 320 may lock all intents (322, 324, and 326) which have a smoking preference, and a musical preference of classical music. Since intents 312, 314, and 316 have at least one preference value (music preference in this example) different from intents 322, 324, and 326, none of the intents locked by matcher 310 have a possibility of being matched with the intents locked by matcher 320. Thus, matcher 310 may operate on intents 312, 314, and 316 in parallel with matcher 320, which may operate on intents 322, 324, and 326. Similarly, matcher 330 may operate on intents 332, 334, and 336 since matcher 330 has locked all intents with a non-smoking preference and classical music preference, which are different from the preference values locked by matchers 310 and 320. Although FIG. 3 illustrates an exemplary embodiment locking on two preferences (dimensions), the locking can be performed on any number of preferences.

Figure 4:
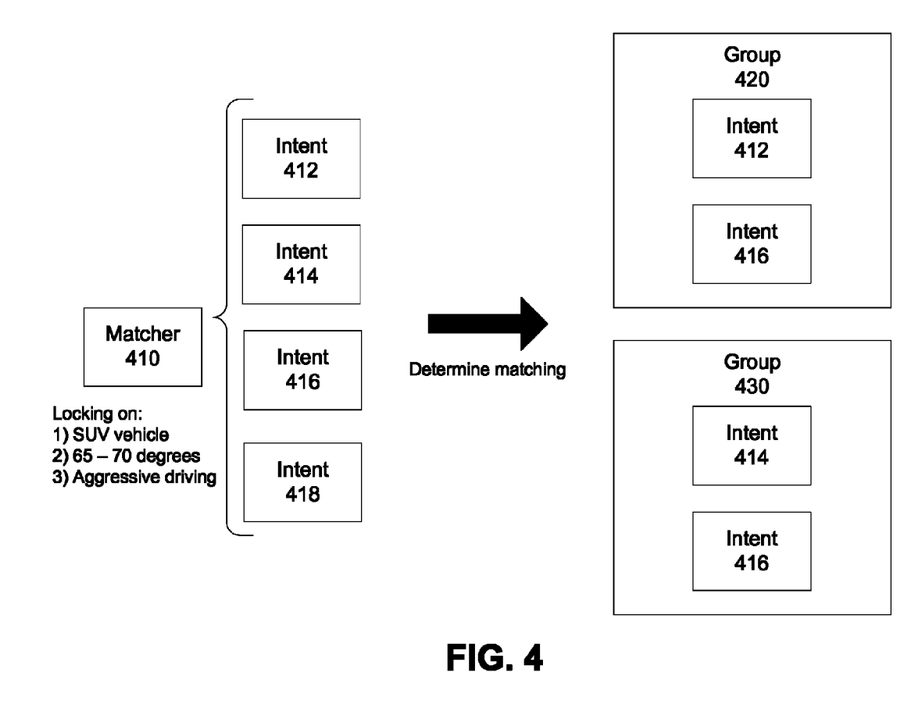
FIG. 4 illustrates locking on multiple preferences or dimensions in an embodiment.

FIG. 4 illustrates locking on 3 preferences or dimensions in an embodiment. Matcher 410 may lock all intents, (412, 414, 416, and 418) which have a vehicle preference of SUV, temperature preference between 65-70 degrees Fahrenheit, and an aggressive driving style preference. Other matchers (not shown) may not operate on the intents locked by matcher 410. Matcher 410 may then examine the preferences of the intents it has locked and determine whether the preferences match. Matched intents may then be grouped together. Matcher 410 may determine that intent 412 and 416 match, and intents 414 and 418 match. Accordingly, intents 412 and 416 may be grouped into group 420, and intents 414 and 418 may be grouped into group 430.

In an embodiment, the above may be implemented via any computer programming language, or any combination of programming languages which can be executed by a computer processor. The programming language may include C++, Java, C#, and C. In an embodiment, the matchers, intents, and preferences may be represented as objects via an object-oriented programming language. In an embodiment, matchers and intents may be stored in a storage device, such as a database. Matchers, intents, and preferences may be stored as rows, or multiple rows in a database. In an embodiment, the locking of intents on N-dimensions may be implemented via memory locking. In an embodiment, the locking of intents on N-dimensions may be implemented via locking in a database, such as row-level locking. In an embodiment, the above may be implemented as part of an application which matches intents. The application may be a standalone application or a web application. The application may be a car-pooling application, such as SAP's TwoGo application.

Figure 5:
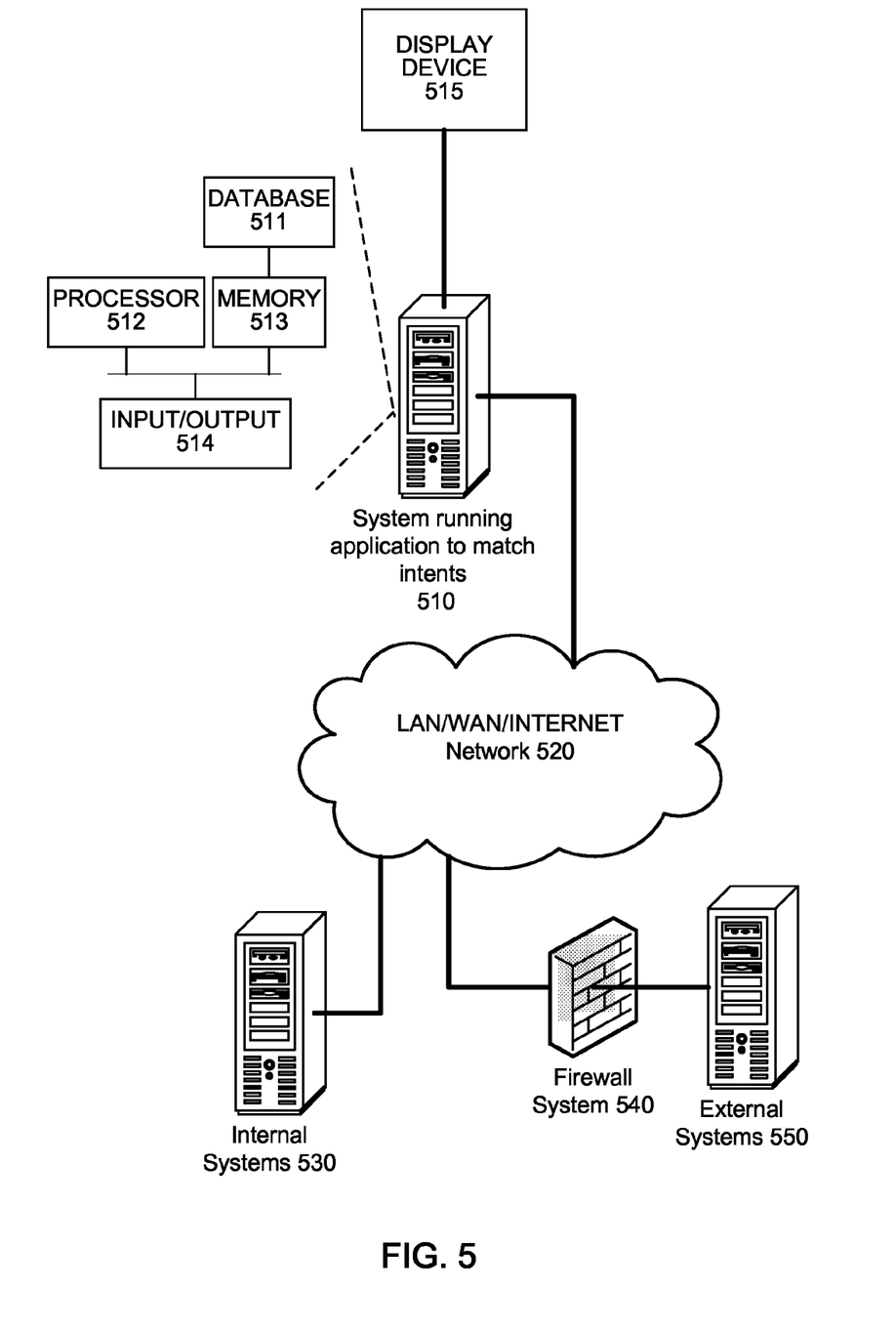
FIG. 5 shows an exemplary architecture in an embodiment of the invention.

FIG. 5 shows an exemplary architecture in an embodiment of the invention. The system running an application to match intents 510 may be coupled to a display device 515, existing internal systems 530 through a network 520 and to external systems 550 through the network 520 and firewall system 540. The system running an application to match intents may include a desktop computer, laptop computer, tablet PC, client computer, mobile phone, central computer in a vehicle, and any other computer. The display device 515 may include a computer monitor, a tablet PC screen, a mobile phone screen, and any other displays. The existing internal systems 530 may include a server and may provide one or more of matcher data, intent data, preference data, and other data. The external systems 550 may include a server and may be maintained by a third party, such as a newspaper, information service provider, or exchange, and may contain matcher data, intent data, preference data, and other data, that may be updated by the third party on a periodic basis. The system running an application to match intents 510 may interact with these external systems to obtain updates through a firewall system 540 separating the internal systems from the external systems.

Each of the systems in FIG. 5 may contain a processing device 512, memory 513, a database 511, and an input/output interface 514, all of which may be interconnected via a system bus. In various embodiments, each of the systems 510, 530, 540, and 550 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

In an embodiment, memory 513 may contain different components for retrieving, presenting, changing, and saving data. Memory 513 may include a variety of memory devices, for example, Dynamic Random Access Memory (DRAM), Static RAM (SRAM), flash memory, cache memory, and other memory devices. Additionally, for example, memory 513 and processing device(s) 512 may be distributed across several different computers that collectively comprise a system.

Database 511 may include any type of data storage adapted to searching and retrieval. The database 511 may include SAP database (SAP DB), Informix, Oracle, DB2, Sybase, and other such database systems.

Processing device 512 may perform computation and control functions of a system and comprises a suitable central processing unit (CPU). Processing device 512 may comprise a single integrated circuit, such as a microprocessing device, or may comprise any suitable number of integrated circuit devices and/or circuit boards working in cooperation to accomplish the functions of a processing device. Processing device 512 may execute computer programs, such as object-oriented computer programs, within memory 513.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software and hardware, but some systems and methods consistent with the present invention may be implemented in software or hardware alone. Additionally, although aspects of the present invention are described as being stored in memory, this may include other computer readable media, such as secondary storage devices, for example, solid state drives, or DVD ROM; the Internet or other propagation medium; or other forms of RAM or ROM.

We claim:

1. A method comprising:
    dividing a plurality of ride intent objects into candidate sets, wherein:
        each ride intent object defines ride preferences of a respective car pool user; and
        each candidate set is associated with a respective ride matcher object that specifies a plurality of ride preferences that ride intent objects in the candidate set must include, the plurality of ride preferences forming a subset of less than all the ride preferences of any particular ride intent object in the candidate set;
    locking the ride intent objects such that only a ride matcher object associated with a candidate set containing a particular ride intent object can perform matching on the particular ride intent object while the particular ride intent object remains locked, wherein unlocked ride intent objects are available for matching by any ride matcher object, and wherein the same ride preference is specified by at least some of the ride matcher objects;
    matching, by each ride matcher object and based on ride preference values, ride intent objects in a respective candidate set to other ride intent objects in the same candidate set;
    identifying, based on ride preference value, a plurality of ride preferences in a first ride intent object that match a corresponding plurality of ride preferences in a second ride intent object, wherein ride preferences are determined to match when:
        there is an exact match between respective values of a first of at least two ride preferences for the first ride intent object and the second ride intent object; and
        respective values of a second of the at least two ride preferences for the first and the second ride intent objects are within a predetermined threshold of similarity;
    assigning different weights to corresponding ride preferences in each ride intent object;
    calculating a sum of the weights associated with the matching ride preferences;
    determining that the first ride intent object matches the second ride intent object when the sum of the weights exceeds a predetermined weight threshold; and
    grouping the plurality of ride intent objects into a plurality of ride intent sets based on the matching, wherein each ride intent set is a subset of a respective candidate set that contains the ride intent objects of the ride intent set.

2. The method of claim 1, wherein:
    at least two ride matcher objects operate in parallel by performing matching on their respective candidate sets at the same time.

3. The method of claim 1, wherein preferences of each ride intent object include at least one of smoking, music, sex, gender, origin of ride, destination of ride, time window of ride, driving style, conversation style, area of occupation, vehicle type, and temperature inside vehicle.

4. The method of claim 1, wherein locking each ride intent object is implemented in memory.

5. The method of claim 1, wherein locking each ride intent object is implemented in a database.

6. The method of claim 1, wherein a respective ride matcher object associated with a candidate set determines that a first ride intent object from the candidate set matches a second ride intent object in the candidate set if each ride preference value of the first ride intent object matches a corresponding ride preference value of the second ride intent object.

7. The method of claim 6, wherein the ride matcher determines that a first ride preference value matches a second ride preference value if the first ride preference value and the second ride preference value are within a predetermined threshold.

8. A non-transitory computer-readable medium embodied with computer-executable instructions for causing a computer to execute instructions, the computer instructions comprising:
    dividing a plurality of ride intent objects into candidate sets, wherein:
        each ride intent object defines ride preferences of a respective car pool user; and
        each candidate set is associated with a respective ride matcher object that specifies a plurality of ride preferences that ride intent objects in the candidate set must include, the plurality of ride preferences forming a subset of less than all the ride preferences of any particular ride intent object in the candidate set;
    locking the ride intent objects such that only a ride matcher object associated with a candidate set containing a particular ride intent object can perform matching on the particular ride intent object while the particular ride intent object remains locked, wherein unlocked ride intent objects are available for matching by any ride matcher object, and wherein the same ride preference is specified by at least some of the ride matcher objects;
    matching, by each ride matcher object and based on ride preference values, ride intent objects in a respective candidate set to other ride intent objects in the same candidate set;
    identifying, based on ride preference value, a plurality of ride preferences in a first ride intent object that match a corresponding plurality of ride preferences in a second ride intent object, wherein ride preferences are determined to match when:
        there is an exact match between respective values of a first of at least two ride preferences for the first ride intent object and the second ride intent object; and
        respective values of a second of the at least two ride preferences for the first and the second ride intent objects are within a predetermined threshold of similarity;
    assigning different weights to corresponding ride preferences in each ride intent object;
    calculating a sum of the weights associated with the matching ride preferences;
    determining that the first ride intent object matches the second ride intent object when the sum of the weights exceeds a predetermined weight threshold; and
    grouping the plurality of ride intent objects into a plurality of ride intent sets based on the matching, wherein each ride intent set is a subset of a respective candidate set that contains the ride intent objects of the ride intent set.

9. The non-transitory computer-readable medium of claim 8, wherein at least two ride matcher objects operate in parallel by performing matching on their respective candidate sets at the same time.

10. The non-transitory computer-readable medium of claim 8, wherein preferences of each ride intent object include at least one of smoking, music, sex, gender, origin of ride, destination of ride, time window of ride, driving style, conversation style, area of occupation, vehicle type, and temperature inside vehicle.

11. The non-transitory computer-readable medium of claim 8, wherein locking each ride intent object is implemented in memory.

12. The non-transitory computer-readable medium of claim 8, wherein locking each ride intent object is implemented in a database.

13. An apparatus comprising:
a processor configured to:
divide a plurality of ride intent objects into candidate sets, wherein:
each ride intent object defines ride preferences of a respective car pool user; and
each candidate set is associated with a respective ride matcher object that specifies a plurality of ride preferences that ride intent objects in the candidate set must include, the plurality of ride preferences forming a subset of less than all the ride preferences of any particular ride intent object in the candidate set;
lock the ride intent objects such that only a ride matcher object associated with a candidate set containing a particular ride intent object can perform matching on the particular ride intent object while the particular ride intent object remains locked, wherein unlocked ride intent objects are available for matching by any ride matcher object, and wherein the same ride preference is specified by at least some of the ride matcher objects;
match, by each ride matcher object and based on ride preference values, ride intent objects in a respective candidate set to other ride intent objects in the same candidate set;
identify, based on ride preference value, a plurality of ride preferences in a first ride intent object that match a corresponding plurality of ride preferences in a second ride intent object, wherein ride preferences are determined to match when:
there is an exact match between respective values of a first of at least two ride preferences for the first ride intent object and the second ride intent object; and
respective values of a second of the at least two ride preferences for the first and the second ride intent objects are within a predetermined threshold of similarity;
assign different weights to corresponding ride preferences in each ride intent object;
calculate a sum of the weights associated with the matching ride preferences;
determine that the first ride intent object matches the second ride intent object when the sum of the weights exceeds a predetermined weight threshold; and
group the plurality of ride intent objects into a plurality of ride intent sets based on the matching, wherein each ride intent set is a subset of a respective candidate set that contains the ride intent objects of the ride intent set.

14. The apparatus of claim 13, wherein at least two ride matcher objects operate in parallel by performing matching on their respective candidate sets at the same time.

15. The apparatus of claim 13, wherein preferences of each ride intent object include at least one of smoking, music, sex, gender, origin of ride, destination of ride, time window of ride, driving style, conversation style, area of occupation, vehicle type, and temperature inside vehicle.

16. The apparatus of claim 13, wherein locking each ride intent object is implemented in memory.

17. The apparatus of claim 13, wherein locking each ride intent object is implemented in a database.

* * * * *